(12) United States Patent
Lim

(10) Patent No.: US 11,800,240 B2
(45) Date of Patent: Oct. 24, 2023

(54) ELECTRONIC APPARATUS AND CONTROL METHOD THEREOF

(71) Applicant: SAMSUNG ELECTRONICS CO., LTD., Suwon-si (KR)

(72) Inventor: Hyungjun Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/846,138

(22) Filed: Jun. 22, 2022

(65) Prior Publication Data

US 2022/0329724 A1 Oct. 13, 2022

Related U.S. Application Data

(63) Continuation of application No. PCT/KR2022/005298, filed on Apr. 12, 2022.

(30) Foreign Application Priority Data

Apr. 13, 2021 (KR) .................. 10-2021-0047787

(51) Int. Cl.
 *H04N 23/745* (2023.01)
 *H04N 25/60* (2023.01)
 *G06T 5/00* (2006.01)

(52) U.S. Cl.
 CPC .......... *H04N 23/745* (2023.01); *G06T 5/002* (2013.01); *H04N 25/60* (2023.01); *G06T 2207/20182* (2013.01)

(58) Field of Classification Search
 None
 See application file for complete search history.

(56) References Cited

U.S. PATENT DOCUMENTS

| 6,710,818 B1 | 3/2004 | Kasahara et al. |
| 7,639,285 B2 | 12/2009 | Nomura et al. |

(Continued)

FOREIGN PATENT DOCUMENTS

| JP | 3506900 B2 | 3/2004 |
| JP | 4904749 B2 | 3/2012 |

(Continued)

OTHER PUBLICATIONS

Communication dated Jul. 26, 2022, issued by the International Searching Authority in counterpart International Application No. PCT/KR2022/005298 (PCT/ISA/210 and PCT/ISA/237).

*Primary Examiner* — Quan Pham
(74) *Attorney, Agent, or Firm* — Sughrue Mion, PLLC

(57) ABSTRACT

An electronic apparatus is provided. The electronic apparatus includes a display and a processor configured to obtain a low-frequency variation amount based on low-frequency information corresponding to a first frame and low-frequency information corresponding to a second frame, obtain a high-frequency variation amount based on high-frequency information corresponding to the first frame and high-frequency information corresponding to the second frame, obtain a weight based on a difference between the low-frequency variation amount and the high-frequency variation amount, apply the weight to a high-frequency frame corresponding to the second frame, obtain an output frame corresponding to the second frame, based on the second frame and a high-frequency frame to which the weight is applied, and control the display to display the obtained output frame.

20 Claims, 13 Drawing Sheets

(56) References Cited

U.S. PATENT DOCUMENTS

| | | |
|---|---|---|
| 8,471,923 B2 | 6/2013 | Urisaka |
| 8,731,062 B2 | 5/2014 | Kanumuri et al. |
| 8,977,069 B2 | 3/2015 | Hwang et al. |
| 9,258,518 B2 | 2/2016 | Salvador et al. |
| 9,811,882 B2 | 11/2017 | Lee et al. |
| 10,334,270 B2 | 6/2019 | Boitard et al. |
| 2002/0158988 A1* | 10/2002 | Wischermann ........... G06T 5/20 348/571 |
| 2005/0047508 A1 | 3/2005 | Ha et al. |
| 2008/0239154 A1* | 10/2008 | Yamauchi ............... G06T 5/002 348/607 |
| 2011/0018877 A1 | 1/2011 | Hwang et al. |
| 2011/0267540 A1* | 11/2011 | Nakatsuka ........... H04N 1/4092 348/625 |
| 2014/0002500 A1* | 1/2014 | Mizuno .................. G09G 5/377 345/634 |
| 2014/0321768 A1* | 10/2014 | Tsai ........................ G06T 5/002 382/263 |
| 2015/0104116 A1 | 4/2015 | Salvador et al. |
| 2015/0213581 A1 | 7/2015 | Lee |
| 2016/0093022 A1 | 3/2016 | Lee et al. |
| 2017/0134745 A1 | 5/2017 | Boitard et al. |

FOREIGN PATENT DOCUMENTS

| | | |
|---|---|---|
| JP | 4971956 B2 | 7/2012 |
| JP | 5119740 B2 | 1/2013 |
| JP | 2017-220879 A | 12/2017 |
| KR | 10-0577364 B1 | 5/2006 |
| KR | 10-0982835 B1 | 9/2010 |
| KR | 10-2014-0135968 A | 11/2014 |
| KR | 10-2015-0090515 A | 8/2015 |
| KR | 10-1590765 B1 | 2/2016 |
| KR | 10-1615479 B1 | 4/2016 |
| KR | 10-2017-0026375 A | 3/2017 |
| KR | 10-2018-0097342 A | 8/2018 |

* cited by examiner

TIME POINT T-1  1-1

TIME POINT T-1  1-2

TIME POINT T  2-1

TIME POINT T  2-2  THIRD BLOCK

LOW-FREQUENCY VARIATION AMOUNT  $\delta E_{LF}$

HIGH-FREQUENCY VARIATION AMOUNT  $\delta E_{HF}$

ELECTRONIC APPARATUS AND CONTROL METHOD THEREOF

CROSS-REFERENCE TO RELATED APPLICATION(S)

This application is a continuation of International Application No. PCT/KR2022/005298, filed on Apr. 12, 2022, in the Korean Intellectual Property Receiving Office, which is based on and claims priority to Korean Patent Application No. 10-2021-0047787, filed on Apr. 13, 2021, in the Korean Intellectual Property Office, the disclosures of which are incorporated by reference herein in their entireties.

BACKGROUND

1. Field

The disclosure relates to an electronic apparatus and a control method thereof, and more particularly, to an electronic apparatus performing image processing, and a control method thereof.

2. Description of the Related Art

FIG. 1 is a diagram of a method for amplifying a high frequency of an image. There has been a development of various devices and methods for outputting an image after performing image processing on the input image to improve its clarity. In this regard, FIG. 1 shows a method for improving the clarity of an image, most commonly used in a field of the image processing.

Referring to FIG. 1, a high-pass filter may be applied to an input frame included in the image to extract a high-frequency component from the frame, and the extracted high-frequency component may then be added to the input frame to amplify the high-frequency component of the input frame.

If the high-frequency component is added to the input frame, it is possible to obtain an output frame having increased clarity and improved image quality. For example, the output frame may have the high-frequency component amplified compared to the input frame, and an object in the frame may thus have a clearer boundary and a fine detail signal amplified on its surface, thereby improving the overall clarity of the frame.

However, the output frame obtained using this method may have the amplified high-frequency component, thus causing an increased variation between the high frequencies of previous and subsequent frames.

If there is such an increased variation between the high frequencies of the plurality of frames included in the image, a flicker phenomenon may occur while the image is reproduced. The flicker phenomenon is an artifact which may occur if the image is provided by an electronic apparatus. A user who is provided with the image may perceive its deteriorated image quality (or artifact) due to the flicker phenomenon more sensitively than its improved clarity due to the amplified high-frequency component.

Accordingly, there is an increasing need for a method of performing the image processing to prevent the flicker phenomenon from occurring by minimizing the variation between the high frequencies of the plurality of frames included in the image, while improving the clarity of the frame.

SUMMARY

Provided is an electronic apparatus that minimizes occurrence of a flicker phenomenon, while improving clarity of an image, and a control method thereof.

Additional aspects will be set forth in part in the description which follows and, in part, will be apparent from the description, or may be learned by practice of the presented embodiments.

In accordance with an aspect of the disclosure, an electronic apparatus may include a display, and a processor configured to obtain a low-frequency variation amount based on low-frequency information corresponding to a first frame and low-frequency information corresponding to a second frame, obtain a high-frequency variation amount based on high-frequency information corresponding to the first frame and high-frequency information corresponding to the second frame, obtain a first weight based on a difference between the low-frequency variation amount and the high-frequency variation amount, obtain a first high-frequency frame, by applying the first weight to a second high-frequency frame corresponding to the second frame, obtain an output frame corresponding to the second frame, based on the second frame and the first high-frequency frame to which the first weight is applied, and control the display to display the obtained output frame, The first weight may be inversely proportional to a difference value, and the difference value may be obtained by subtracting the low-frequency variation amount from the high-frequency variation amount, The processor may be further configured to obtain the low-frequency variation amount based on low-frequency information of a first block among a plurality of blocks included in the first frame and low-frequency information of a second block among a plurality of blocks included in the second frame, obtain the high-frequency variation amount based on first high-frequency information of the first block and second high-frequency information of the second block, obtain a first high-frequency block by applying the first weight to a second high-frequency block corresponding to the second block, and obtain an output block corresponding to the second block, based on the second block and the first high-frequency block to which the first weight is applied.

The processor may be further configured to obtain a plurality of weights by comparing the low-frequency variation amount with the high-frequency variation amount corresponding to each of the plurality of blocks included in the second frame, and obtain the first high-frequency frame by applying each weight of the plurality of weights corresponding to each of the plurality of blocks included in the first high-frequency frame.

The processor may be further configured to obtain the output block by summing pixel values included in the second block and corresponding pixel values in the first high-frequency block based on the difference between the low-frequency variation amount and the high-frequency variation amount being less than or equal to a first threshold value, and obtain the second block as the output block based on the difference between the low-frequency variation amount and the high-frequency variation amount being greater than or equal to a second threshold value.

The processor may be further configured to obtain the output block based on the difference between the low-frequency variation amount and the high-frequency variation amount being greater than the first threshold value and less than the second threshold value.

The processor may be further configured to obtain the first high-frequency frame corresponding to the second frame by applying a first high-pass filter (HPF) to the second frame, obtain the low-frequency information corresponding to the second frame by applying a first low-pass filter (LPF) to the second frame, and obtain the high-frequency information corresponding to the second frame by applying a second HPF to the second frame.

The processor may be further configured to obtain the first weight based on a ratio of the high-frequency variation amount to the low-frequency variation amount.

The processor may be further configured to obtain a low-frequency frame corresponding to the second frame and the low-frequency information including a frequency lower than a threshold frequency, by applying an LPF to the second frame, and obtain the first high-frequency frame and the high-frequency information, corresponding to the second frame including a frequency greater than or equal to the threshold frequency, based on a difference between the second frame and the low-frequency frame.

The processor may be further configured to obtain the low-frequency variation amount, based on the low-frequency information obtained from the first frame including a frequency greater than or equal to a first threshold frequency and less than a second threshold frequency.

In accordance with an aspect of the disclosure, a control method of an electronic apparatus may include obtaining a low-frequency variation amount based on low-frequency information corresponding to a first frame and low-frequency information corresponding to a second frame, obtaining a high-frequency variation amount based on high-frequency information corresponding to the first frame and high-frequency information corresponding to the second frame, obtaining a first weight based on a difference between the low-frequency variation amount and the high-frequency variation amount, obtaining a first high-frequency frame, by applying the first weight to a second high-frequency frame corresponding to the second frame, obtaining an output frame corresponding to the second frame, based on the second frame and the first high-frequency frame to which the first weight is applied, and displaying the obtained output frame.

The first weight may be inversely proportional to a difference value obtained by subtracting the low-frequency variation amount from the high-frequency variation amount.

The obtaining of the low-frequency variation amount may include obtaining the low-frequency variation amount, based on low-frequency information of a first block among a plurality of blocks included in the first frame, and low-frequency information of a second block among a plurality of blocks included in the second frame. The obtaining of the high-frequency variation amount may include obtaining the high-frequency variation amount, based on first high-frequency information of the first block and second high-frequency information of the second block. The obtaining of the first high-frequency frame may include obtaining a high-frequency block by applying the first weight to a high-frequency block corresponding to the second block. The obtaining of the output frame may include obtaining an output block corresponding to the second block, based on the second block and the high-frequency block to which the first weight is applied.

The obtaining of the first high-frequency frame to which the first weight is applied may include obtaining a plurality of weights by comparing the low-frequency variation amount with the high-frequency variation amount, corresponding to each of the plurality of blocks included in the second frame, and obtaining the first high-frequency frame to by applying each weight of the plurality of weights corresponding to each of the plurality of blocks included in the first high-frequency frame.

The obtaining of the output frame may include obtaining the output block by summing pixel values included in the second block and corresponding pixel values in the high-frequency block based on the difference between the low-frequency variation amount and the high-frequency variation amount being less than or equal to a first threshold value, and obtaining the second block as the output block based on the difference between the low-frequency variation amount and the high-frequency variation amount being greater than or equal to a second threshold value.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
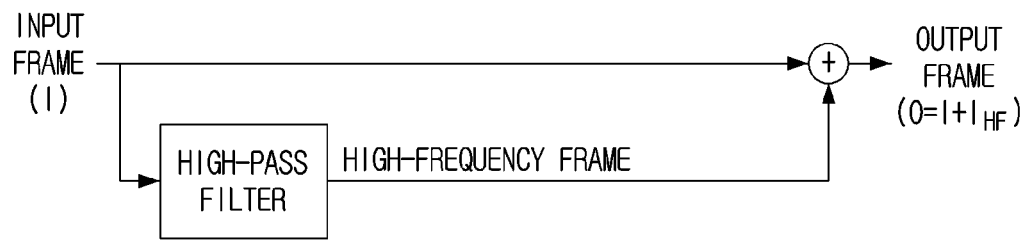
FIG. 1 is a diagram of a method for amplifying a high frequency of an image.
Figure 1:
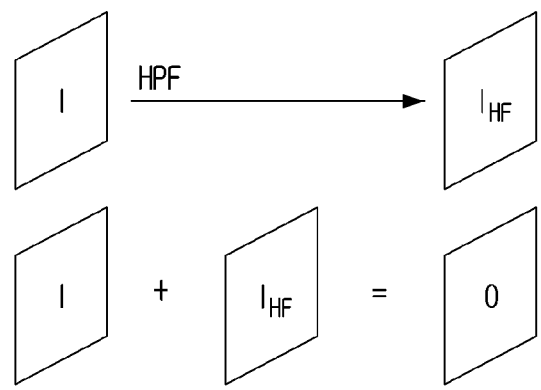

Terms used in the present specification are briefly described, and the disclosure will then be described in detail.

General terms that are currently widely used were selected as terms used in embodiments of the disclosure in consideration of functions in the disclosure, but may be changed depending on the intention of those skilled in the art or a judicial precedent, the emergence of a new technique, and the like. In this case, the meanings of such terms are mentioned in detail in corresponding description portions of the disclosure. Therefore, the terms used in embodiments of the disclosure should be defined on the basis of the meanings of the terms and the contents throughout the disclosure rather than simple names of the terms.

The disclosure may be variously modified and have several embodiments, and specific embodiments of the disclosure are thus illustrated in the drawings and described in detail in the detailed description. However, it is to be understood that the disclosure is not limited to specific embodiments, but includes all modifications, equivalents, and substitutions without departing from the scope and spirit of the disclosure. In case that it is decided that the detailed description of the known art related to the disclosure may obscure the gist of the disclosure, a detailed description thereof will be omitted.

Terms 'first', 'second', and the like, may be used to describe various components, but the components are not to be construed as being limited by these terms. The terms are used only to distinguish one component from another component.

Singular forms used herein are intended to include plural forms unless explicitly indicated otherwise. It is to be understood that a term 'include' or 'formed of' used in the specification specifies the presence of features, numerals, steps, operations, components, parts or combinations thereof, which is mentioned in the specification, and does not preclude the presence or addition of one or more other features, numerals, steps, operations, components, parts or combinations thereof.

In the embodiments, a 'module' or a '~er/~or' may perform at least one function or operation, and be implemented by hardware or software or be implemented by a combination of hardware and software. In addition, a plurality of 'modules' or a plurality of '~ers/~ors' may be integrated in at least one module and be implemented by at least one processor (not illustrated) except for a 'module' or a '~er/or' that needs to be implemented by a specific hardware.

Hereinafter, embodiments of the disclosure will be described in detail with reference to the accompanying drawings so that those skilled in the art to which the disclosure pertains may easily practice the disclosure. However, the disclosure may be modified in various different forms, and is not limited to embodiments provided in the present specification. In addition, in the drawings, portions unrelated to the description are omitted to clearly describe the disclosure, and similar portions are denoted by similar reference numerals throughout the specification.

FIG. 1 is a diagram of a method for amplifying a high frequency of an image.

Referring to FIG. 1, an electronic apparatus may use a high-pass filter (HPF) to obtain a high-frequency frame $I_{HF}$ corresponding to an input frame I. The electronic apparatus may then add the obtained high-frequency frame $I_{HF}$ to the input frame I to obtain an output frame O.

The output frame O may be a frame where a high-frequency component of the input frame I is amplified, and the output frame O may have improved clarity and image quality than the input frame I.

However, the image processing of FIG. 1 may amplify the high-frequency component of each of the plurality of frames included in an input image, thus increasing variation between the high frequencies of successive frames. Therefore, a user who is provided with the image may mainly perceive the deteriorated image quality, artifact or flicker phenomenon (e.g., a display flickers if the frame is switched to another) rather than improved clarity of the image.

Hereinafter, the description describes a method of performing the image processing for improving the clarity and image quality of the input frame while preventing the flicker from occurring according to various embodiments of the disclosure.

Figure 2:
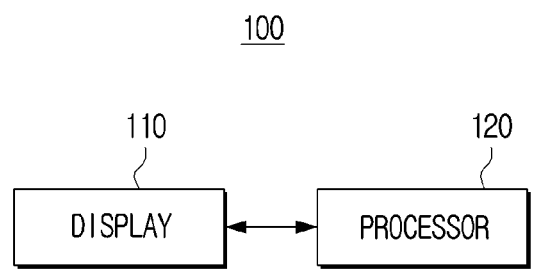
FIG. 2 is a diagram of a configuration of an electronic apparatus according to an embodiment.

FIG. 2 is a diagram of a configuration of an electronic apparatus according to an embodiment.

Referring to FIG. 2, an electronic apparatus 100 includes a display 110 and a processor 120.

The electronic apparatus 100 may be implemented as a television (TV), and is not limited thereto. The electronic apparatus 100 may be applied without limitation as long as the apparatus has a display function, such as a smartphone, a tablet personal computer (PC), a laptop PC, a head mounted display (HMD), a near eye display (NED), a large format display (LFD), a digital signage, a digital information display (DID), a video wall or a projector display.

The display 110 according to an embodiment of the disclosure may be implemented as any of various types of displays such as a liquid crystal display (LCD), an organic light-emitting diode (OLED), a liquid crystal on silicon (LCoS), a digital light processing (DLP), a quantum dot (QD) display panel, a quantum dot light-emitting diodes (QLED), a micro light-emitting diode (μLED) or mini LED. The display 110 may be implemented as a touch screen combined with a touch sensor, a flexible display, a rollable display, a three-dimensional (3D) display, a display in which a plurality of display modules are physically connected with each other, etc.

The processor 120 may control an overall operation of the electronic apparatus 100.

The processor 120 may be implemented as a digital signal processor (DSP) that processes a digital video signal, a microprocessor or a time controller (TCON). However, the processor 120 is not limited thereto, and may include one or more of a central processing unit (CPU), a micro controller unit (MCU), a micro processing unit (MPU), a controller, an application processor (AP), a communication processor (CP) or an advanced RISC machine (ARM) processor, or may be defined by these terms. In addition, the processor 120 may be implemented as a system-on-chip (SoC) or a large scale integration (LSI), in which a processing algorithm is embedded, or may be implemented in the form of a field programmable gate array (FPGA).

Referring to FIG. 1, the system depicted in FIG. 1 may obtain the output frame O by adding the high-frequency frame $I_{HF}$ obtained from the input frame I to the input frame I.

On the contrary, the processor 120 according to various embodiments of the disclosure may measure flicker intensity, and obtain an output frame O by differentially adding a high-frequency frame $I_{HF}$ obtained from an input frame I to the input frame I based on the measured flicker intensity.

The flicker intensity may indicate that a variation between the high-frequencies of successive frames is increased as a high-frequency component of the input frame I is amplified, and a flicker phenomenon predicted to occur is numerically predicted (or expressed).

For example, if the flicker phenomenon is predicted to strongly occur as the high-frequency component of the input frame I is amplified, based on the flicker intensity, the processor 120 may obtain the output frame O by adjusting the high-frequency frame $I_{HF}$ obtained from the input frame I to be slightly amplified and then adding the amplified high-frequency component to the input frame I. In this manner, it is possible to prevent the occurrence of the flicker phenomenon.

For another example, if the flicker phenomenon is predicted not to occur even though the high-frequency component of the input frame I is amplified, based on the flicker intensity, the processor 120 may obtain the output frame O by adding the high-frequency frame $I_{HF}$ obtained from the input frame I to the input frame I. Therefore, the output frame O may have improved clarity and image quality than the input frame I.

Hereinafter, described are various embodiments for measuring the flicker intensity.

Figure 3:
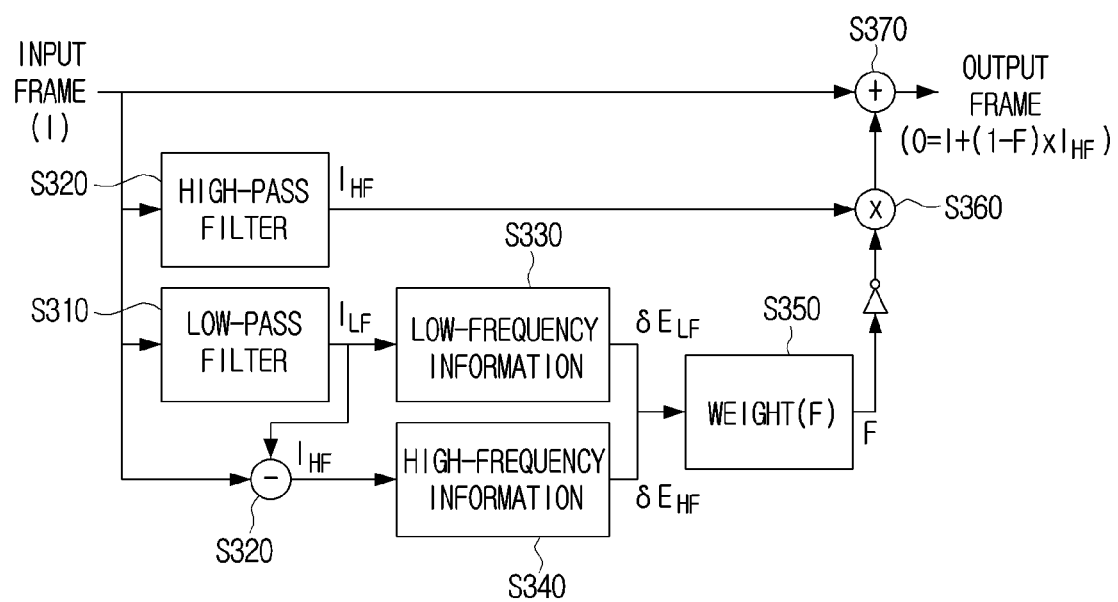
FIG. 3 is a diagram of a system for obtaining an output frame, according to an embodiment.
Figure 4A:
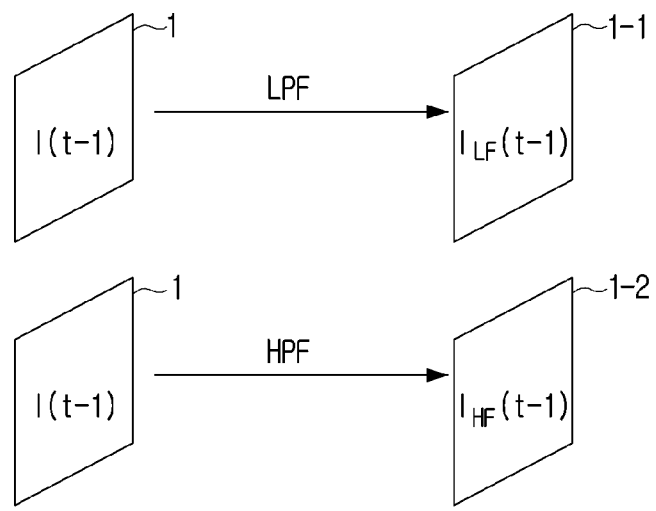
FIGS. 4A and 4B are diagrams of a low-frequency frame and a high-frequency frame according to an embodiment.
Figure 4B:
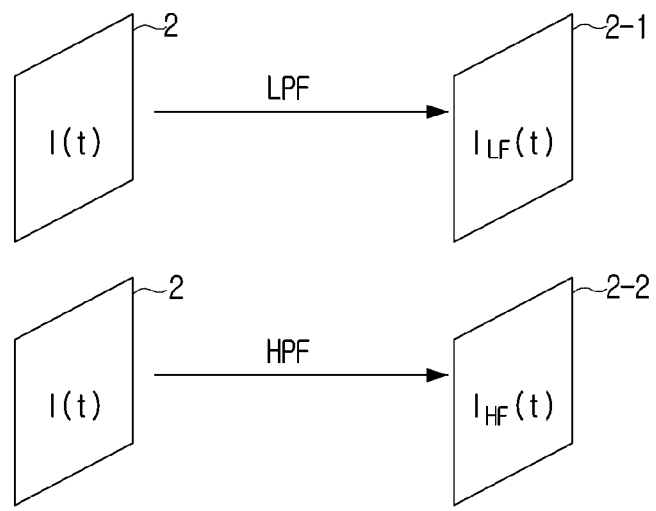

FIG. 3 is a diagram of a system for obtaining an output frame, according to an embodiment. FIGS. 4A and 4B are diagrams of a low-frequency frame and a high-frequency frame according to an embodiment.

<Time Point t−1>

At a time point t−1, the processor 120 may obtain a low-frequency frame corresponding to a first frame among a plurality of frames included in an input image by using a low-pass filter S310. The processor 120 may then obtain the low-frequency information, based on the low-frequency frame corresponding to the first frame. For example, the processor 120 may obtain the frequency information including a frequency lower than a threshold frequency from the first frame. The threshold frequency may correspond to filtering intensity of the low-pass filter.

In addition, the processor 120 may obtain a high-frequency frame corresponding to the first frame by using a high-pass filter S320. The processor 120 may then obtain the high-frequency information based on the high-frequency frame corresponding to the first frame. For example, the processor 120 may obtain the high-frequency information greater than or equal to the threshold frequency from the first frame. The threshold frequency may correspond to the filtering intensity of the low-pass filter as described above, or filtering intensity of the high-pass filter.

The low-frequency information and the high-frequency information may each be referred to as a low-frequency component and the high-frequency component. However, for convenience of description, these components are each collectively referred to as the low-frequency information and the high-frequency information in the following various embodiments.

The first frame may indicate a frame corresponding to the time point t−1 among the plurality of frames included in the input image.

Referring to FIG. 3, the processor 120 according to an embodiment may obtain the high-frequency frame corresponding to the first frame by using the high-pass filter S320. For another example, the processor 120 may also obtain the high-frequency frame (i.e., a difference frame obtained by subtracting the low-frequency frame obtained by the low-pass filter S310 from the first frame).

The processor 120 according to an embodiment of the disclosure may store, in a memory (not shown), the low-frequency information and the high-frequency information each corresponding to the first frame, obtained in the high-pass filter S310 and the low-pass filter S320 at the time point t−1.

<Time Point t>

At a time point t, the processor 120 may obtain a low-frequency frame corresponding to a second frame among the plurality of frames included in the input image by using the low-pass filter S310. The processor 120 may then obtain the low-frequency information based on the low-frequency frame corresponding to the second frame. For example, the processor 120 may obtain the low-frequency information lower than the threshold frequency from the second frame.

In addition, the processor 120 may obtain a high-frequency frame corresponding to the second frame by using the high-pass filter S320. The processor 120 may then obtain the high-frequency information based on the low-frequency frame corresponding to the second frame. For example, the processor 120 may obtain the high-frequency information greater than or equal to the threshold frequency from the second frame.

The second frame may indicate a frame corresponding to the time point t among the plurality of frames included in the input image (i.e., frame successive to the first frame in time).

The low-frequency frame and the high-frequency frame each obtained at the time point t−1 and time point t are described with reference to the drawings, as shown in FIGS. 4A and 4B.

Referring to FIG. 4A, the processor 120 may obtain a low-frequency frame $I_{LF(t-1)}$ 1-1 and a high-frequency frame $I_{HF(t-1)}$ 1-2 each corresponding to a first frame $I_{(t-1)}$ 1 at the time point t−1.

The processor 120 according to an embodiment may obtain the low-frequency information based on the low-frequency frame 1-1 corresponding to the first frame 1.

For example, the processor 120 may obtain the low-frequency information based on Equation (1).

$$E_{LF} = \sum_{(x,y)} \{|I_{LF}(x, y)|\} \tag{1}$$

(x, y) may indicate pixel coordinates in the frame, $I_{LF}$ (x, y) may indicate the pixel values or frequency values of the (x, y) pixels in the low-frequency frame, and $E_{LF}$ may indicate the low-frequency information (e.g., low-frequency energy or low-frequency power, and hereinafter, collectively referred to as the low-frequency information) of the low-frequency frame.

In addition, the processor 120 according to an embodiment may obtain the high-frequency information based on the high-frequency frame 1-2 corresponding to the first frame 1, based on Equation (2).

$$E_{HF} = \sum_{(x,y)} \{|I_{HF}(x, y)|\} \text{ or } E_{HF} = \sum_{(x,y)} \{|I(x, y) - I_{LF}(x, y)|\} \tag{2}$$

(x, y) may indicate the pixel coordinates in the frame, I(x, y) may indicate the pixel values or frequency values of the (x, y) pixels in the input frame, $I_{HF}$ (x, y) may indicate the pixel values or frequency values of the (x, y) pixels in the high-frequency frame, and $E_{HF}$ may indicate the high-frequency information (high-frequency energy or high-frequency power, and hereinafter, collectively referred to as the high-frequency information) of the high-frequency frame.

Referring to FIG. 4B, at the time point t−1, the processor 120 may obtain a low-frequency frame $I_{LF(t)}$ 2-1 and a high-frequency frame $I_{HF(t)}$ 2-2 each corresponding to a second frame $I_{(t)}$ 2.

The processor 120 according to an embodiment may obtain the low-frequency information corresponding to the second frame 2, based on the low-frequency frame 2-1, which corresponds to the second frame 2, and Equation (1).

In addition, the processor 120 according to an embodiment may obtain the high-frequency information corresponding to the second frame 2, based on the high-frequency frame 2-2, which corresponds to the second frame 2, and Equation (2).

Equations (1) and (2) calculate the low-frequency information $E_{LF}$ and the high-frequency information $E_{HF}$ based on a sum of the respective absolute pixel values or absolute frequency values of the plurality of pixels. However, these equations are only examples and the disclosure is not limited thereto. For example, each of the low-frequency information (e.g., $E_{LF}=\Sigma_{(x,y)}\{|I_{LF}(x, y)|^2\}$) and the high-frequency information (e.g., $E_{HF}=\Sigma_{(x,y)}\{|I_{HF}(x, y)|^2\}$) may also be obtained based on a sum of the squares of the respective pixel values or frequency values of the plurality of pixels.

Referring back to FIG. 3, the processor 120 may obtain low-frequency variation amount based on low-frequency information $E_{LF}(t-1)$ obtained from the first frame 1 and low-frequency information $E_{LF}(t)$ obtained from the second frame 2 (S330).

In addition, the processor 120 may obtain a high-frequency variation amount based on high-frequency information $E_{HF}(t-1)$ obtained from the first frame 1 and high-frequency information $E_{HF}(t)$ obtained from the second frame 2 S340.

Figure 5:
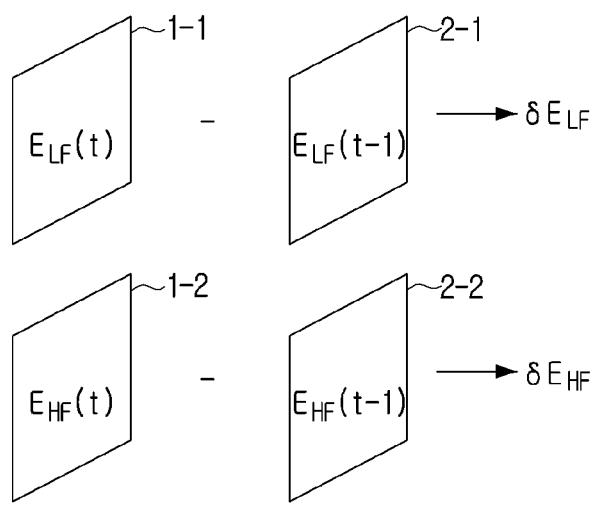
FIG. 5 is a diagram of low-frequency variation amount and high-frequency variation amount according to an embodiment.

The disclosure provides an operation of obtaining the low-frequency variation amount and the high-frequency variation amount with reference to FIG. 5.

FIG. 5 is a diagram of low-frequency variation amount and high-frequency variation amount according to an embodiment.

Referring to FIG. 5, the processor 120 may obtain low-frequency variation amount $\sigma E_{LF}$ corresponding to the second frame 2 based on a difference between the low-frequency information $E_{LF}(t-1)$ obtained from the first frame 1 at the time point t−1 and the low-frequency information $E_{LF}(t)$ obtained from the second frame 2 at the time point t.

In addition, the processor 120 may obtain high-frequency variation amount $\delta E_{HF}$ corresponding to the second frame 2 based on a difference between the high-frequency information $E_{HF}(t-1)$ obtained from the first frame 1 at the time point t−1 and the high-frequency information $E_{HF}(t)$ obtained from the second frame 2 at the time point t.

The description described above with reference to FIG. 5 may be expressed as Equation (3) below.

$$\delta E_{LF}=|E_{LF}(t)-E_{LF}(t-1)|, \delta E_{HF}=|E_{HF}(t)-E_{HF}(t-1)| \qquad (3)$$

Referring back to FIG. 3, the processor 120 may measure the flicker intensity based on the low-frequency variation amount $\delta E_{LF}$ and the high-frequency variation amount $\delta E_{HF}$ S350.

The flicker intensity may indicate a degree of adjusted intensity of the high-frequency frame $I_{HF}$ added to the input frame I for improving the clarity, and this intensity degree may be referred to as a weight. Hereinafter, for convenience of explanation, the flicker intensity is referred to as the weight.

Figure 6:
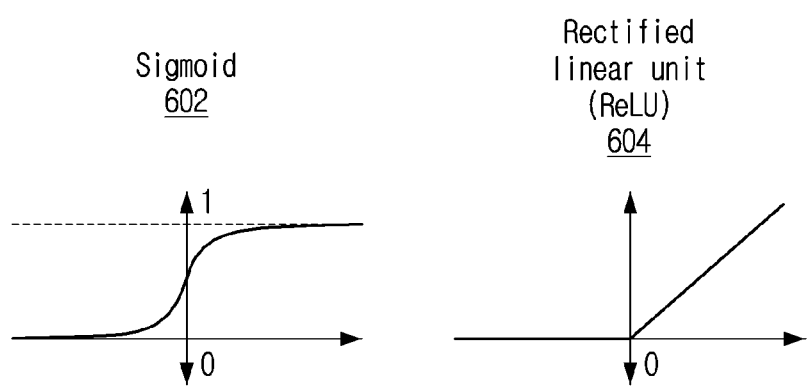
FIG. 6 is a diagram of graphs showing a function for obtaining a weight according to an embodiment.

FIG. 6 is a diagram of graphs showing a function for obtaining a weight according to an embodiment.

The low-frequency variation amount $\delta E_{LF}$ and the high-frequency variation amount $\delta E_{HF}$ each indicate variation amount of the low-frequency energy over time and variation amount of high-frequency energy over time.

In an embodiment of the disclosure, it may be assumed that the flicker intensity is higher as the variation amount of the high frequency energy is greater than the variation amount of the low frequency energy (e.g., $\delta E_{HF} > \delta E_{LF}$).

In addition, the processor 120 may calculate the flicker intensity in consideration of only the high-frequency variation amount $\delta E_{HF}$. However, the processor 120 according to an embodiment of the disclosure may consider both the low-frequency variation amount $\delta E_{LF}$ and the high-frequency variation amount $\delta E_{HF}$.

If both the low-frequency variation amount $\delta E_{LF}$ and the high-frequency variation amount $\delta E_{HF}$ are high, it may be a situation where an object is moved in the frame or a scene is changed, rather than a situation where the flicker occurs while the frame is switched to another. The processor 120 may calculate the flicker intensity in consideration of both the low-frequency variation amount $\delta E_{LF}$ and the high-frequency variation amount $\delta E_{HF}$.

For example, the processor 120 may obtain the flicker intensity, i.e. the weight, based on Equation (4) below.

$$F=f(\delta E_{HF}-\delta E_{LF}) \qquad (4)$$

The disclosure provides an example of the function f(x) with reference to the graphs shown in FIG. 6.

An F-value may be a value of zero to 1, and a function f(x) may be a one-dimensional function that outputs a value proportional to x. For example, the F-value may be greater when the high-frequency variation amount $\delta E_{HF}$ is greater than the low-frequency variation amount $\delta E_{LF}$.

A Sigmoid function 602 and a rectified linear unit (ReLU) function 604, shown in FIG. 6, are only examples, and the processor 120 may obtain the F-value by using various types of functions f(x) in which the F-value is greater when the high-frequency variation amount $\delta E_{HF}$ is greater than the low-frequency variation amount $\delta E_{LF}$. The greater a difference between the high-frequency variation amount $\delta E_{HF}$ and the low-frequency variation amount $\delta E_{LF}$, the greater the F-value. In this case, a weight 1−F may be inversely proportional to the difference between the high-frequency variation amount $\delta E_{HF}$ and the low-frequency variation amount $\delta E_{LF}$.

Referring back to FIG. 3, the processor 120 may obtain the weight based on the difference between the low-frequency variation amount $\delta E_{LF}$ and the high-frequency variation amount $\delta E_{HF}$, and may obtain a high-frequency frame to which the weight is applied, by applying the weight to the high-frequency frame $I_{HF}(t)$ 2-2 corresponding to the second frame 2.

The above example describes that the processor 120 obtains the F-value and the weight 1−F, based on a difference value obtained by subtracting the low-frequency variation amount from the high-frequency variation amount. However, this manner is an example and may not be limited thereto.

For another example, the processor 120 may obtain the F-value and the weight 1−F, based on a ratio of the high-frequency variation amount to the low-frequency variation amount. For example, if the ratio of the high-frequency variation amount to the low-frequency variation amount is greater than or equal to a threshold ratio, the processor 120 may predict that the flicker intensity is high because the high-frequency variation amount is greater than the low-frequency variation amount (e.g., $\delta E_{HF} > \delta E_{LF}$). The processor 120 may obtain the F-value and the weight 1−F, based on the ratio of the high-frequency variation amount to the low-frequency variation amount. The F-value may be proportionally greater as the ratio of the high-frequency variation amount $\delta E_{HF}$ to the low-frequency variation amount $\delta E_{LF}$ is greater.

It is assumed that the weight has the 1−F value according to the various embodiments of the disclosure. However, this assumption is only an example, and the weight may indicate any of various values inversely proportional to the F-value, such as weight 1/F. The processor 120 may then obtain a third frame by substituting the high-frequency frame $I_{HF}(t)$ 2-2 and the weight 1−F of the second frame 2 into Equation (5) (S360 in FIG. 3).

$$I_{HF(t)}'=(1-F)*I_{HF(t)} \qquad (5)$$

$I_{HF(t)}'$ may indicate the high-frequency frame to which the weight 1−F is applied, and $I_{HF(t)}$ may indicate the high-frequency frame 2-2 of the second frame 2.

The processor 120 may then obtain the output frame O, based on the high-frequency frame $I_{HF(t)}'$ to which the weight 1−F is applied and the second frame 2 (S370 in FIG. 3). This operation may be expressed as Equation (6) below.

$$O = I + (1-F) * I_{HF(t)} \quad (6)$$

I may indicate the input frame (i.e., second frame 2 at the time point t), and $1-F*I_{HF(t)}'$ may indicate the high-frequency frame $I_{HF(t)}'$ to which the weight 1−F is applied at the time point t.

As shown from Equations (5) and (6), the output frame O may be obtained by summing the second frame 2 and the high-frequency frames 2-2 of the second frame 2. The processor 120 may merge the high-frequency frame 2-2 and the second frame 2 with each other by adjusting the intensity of the high-frequency frame 2-2 of the second frame 2 based on the flicker intensity (i.e., weight 1−F).

The above embodiment describes that the processor 120 may obtain the low-frequency variation amount $\delta E_{LF}$, based on the low-frequency information $E_{LF}(t-1)$ of the first frame 1 corresponding to the time point t−1 and the low-frequency information $E_{LF}(t)$ of the second frame 2 corresponding to the time point t; may obtain the high-frequency variation amount $\delta E_{HF}$ based on the high-frequency information $E_{HF}(t-1)$ of the first frame 1 corresponding to the time point t−1 and the high-frequency information $E_{HF}(t)$ of the second frame 2 corresponding to the time point t; and may then obtain the weight 1−F corresponding to the second frame 2, based on the low-frequency variation amount $\delta E_{LF}$ and the high-frequency variation amount $\delta E_{HF}$. According to an embodiment, the greater the difference between the low-frequency variation amount $\delta E_{LF}$ and the high-frequency variation amount $\delta E_{HF}$, the greater the F-value, and the smaller the weight 1−F.

However, this manner is an example, and the processor 120 may obtain the weight 1−F corresponding to each of the plurality of successive frames included in the input image, and may obtain the output frame O corresponding to each of the plurality of frames.

For example, the processor 120 may obtain the low-frequency variation amount $\delta E_{LF}$, based on the low-frequency information $E_{LF}(t)$ of the second frame 2 corresponding to the time point t and low-frequency information $E_{LF(t+1)}$ of the third frame corresponding to a time point t+1; may obtain the high-frequency variation amount $\delta E_{HF}$, based on the high-frequency information $E_{HF(t)}$ of the second frame 2 corresponding to the time point t and high-frequency information $E_{HF(t+1)}$ of the third frame corresponding to the time point t+1; and may then obtain the weight 1−F corresponding to the third frame, based on the low-frequency variation amount $\delta E_{LF}$ and the high-frequency variation amount $\delta E_{HF}$.

According to an embodiment, the function f(x) may be assumed to be the ReLU function (i.e., a one-dimensional function that outputs the value proportional to x). If the difference value obtained by subtracting the low-frequency variation amount from the high-frequency variation amount is greater than a first threshold value and smaller than a second threshold value, the processor 120 may apply the weight obtained based on the difference value, obtained by subtracting the low-frequency variation amount from the high-frequency variation amount, to the high-frequency frame $I_{HF(t)}$ 2-2 of the second frame 2 to obtain the high-frequency frame $I_{HF(t)}'$ to which the weight 1−F is applied.

For another example, if the difference between the low-frequency variation amount and the high-frequency variation amount is less than or equal to the first threshold value, the processor 120 may obtain the output frame O by summing the second frame 2 and the high-frequency frame $I_{HF(t)}$ 2-2 of the second frame 2 to each other.

That is, if the difference between the low-frequency variation amount and the high-frequency variation amount is less than or equal to zero, that is, if there is no difference between the two variation amount, the processor 120 may obtain the output frame O by summing the second frame 2 and the high-frequency frame $I_{HF(t)}$ 2-2 of the second frame 2 to each other.

For yet another example, if the difference value obtained by subtracting the low-frequency variation amount from the high-frequency variation amount is greater than or equal to the second threshold value, the processor 120 may obtain the second frame 2 as the output frame O without summing the second frame 2 and the high-frequency frame $I_{HF(t)}$ 2-2 of the second frame 2.

Referring back to FIG. 2, the processor 120 according to an embodiment of the disclosure may divide each of the first frame and the second frame into block units having a predetermined size, and obtain the weight 1−F corresponding to each of the plurality of blocks. Hereinafter, the description describes various embodiments for obtaining the weight 1−F for each block.

Figure 7A:
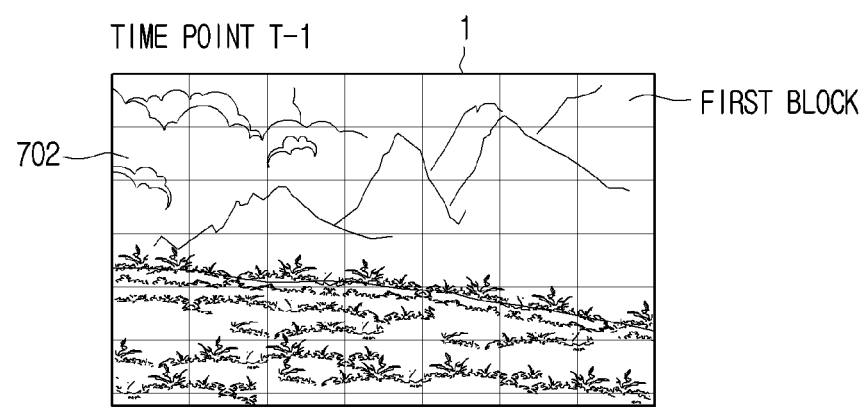
FIGS. 7A and 7B are diagrams of a plurality of blocks included in a frame according to an embodiment.
Figure 7A:
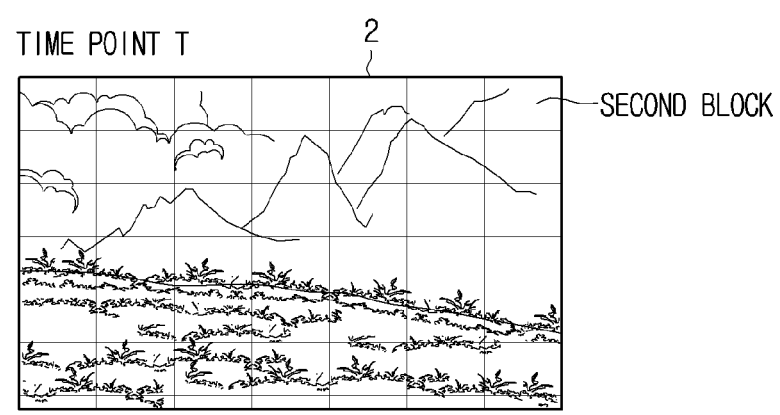
Figure 7B:
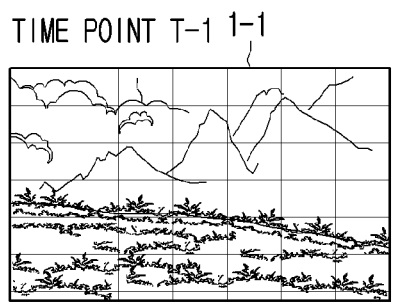
Figure 7B:
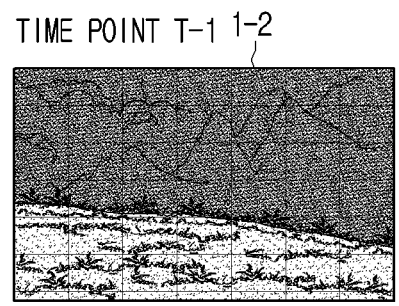
Figure 7B:
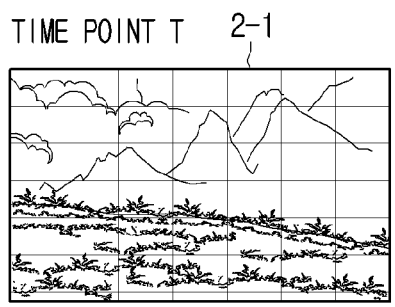
Figure 7B:
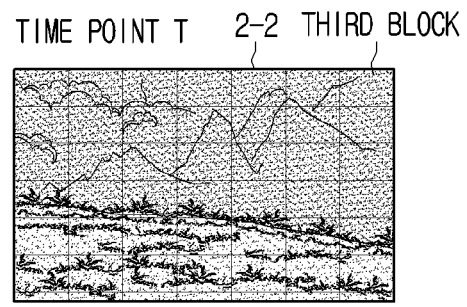
Figure 7B:
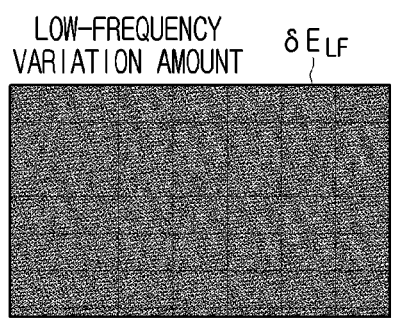
Figure 7B:
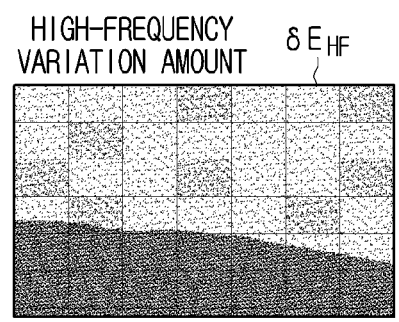

FIGS. 7A and 7B are diagrams of a plurality of blocks included in a frame according to an embodiment.

Referring to FIG. 7A, the processor 120 may divide the first frame 1 corresponding to the time point t−1 and the second frame 2 corresponding to the time point t into the block units having the predetermined size, such as block 702. The predetermined size may be variously changed based on a size of the memory, a resource of the electronic apparatus 100, a resolution of the input image, etc.

For example, the processor 120 may divide the first frame 1 into the block units having the predetermined size to obtain a total of 3600 blocks including 80 horizontal blocks by 45 vertical blocks. In addition, the processor 120 may also divide the second frame 2 into the total of 3600 blocks. The specific number is an example for convenience of description, and the disclosure is not limited thereto.

The processor 120 may then obtain the low-frequency variation amount based on the low-frequency information of a first block among the plurality of blocks included in the first frame 1 and the low-frequency information of a second block among the plurality of blocks included in the second frame.

The description describes this manner in detail below with reference to FIG. 7B.

Referring to FIG. 7B, the processor 120 may obtain the low-frequency variation amount, based on the low-frequency information of the first block among the plurality of blocks included in the low-frequency frame $I_{LF(t-1)}$ 1-1 of the first frame 1 corresponding to the time point t−1, and the low-frequency information of the second block among the plurality of blocks included in the low-frequency frame $I_{LF(t-1)}$ 2-1 of the second frame 2 corresponding to the time point t. The second block may be a block corresponding in position to the first block.

In addition, the processor 120 may obtain the high-frequency variation amount based on the high-frequency information of the first block among the plurality of blocks included in the high-frequency frame $I_{HF(t-1)}$ 1-2 of the first frame 1 corresponding to the time point t−1, and the high-frequency information of the second block among the plurality of blocks included in the high-frequency frame $I_{HF(t)}$ 2-2 of the second frame 2 corresponding to the time point t.

The processor 120 according to an embodiment may obtain the low-frequency variation amount and the high-frequency variation amount, corresponding to each of the plurality of blocks.

The processor 120 may obtain the low-frequency variation amount and the high-frequency variation amount for each block shown at the bottom of FIG. 7B, based on Equation (7) below.

$$E_{LF} = \sum_{(x,y) \in B} \{|I_{LF}(x, y)|\}, E_{HF} = \sum_{(x,y) \in B} \{|I(x, y) - I_{LF}(x, y)|\} \quad (7)$$

B may indicate a block. The processor 120 may obtain the low-frequency information $E_{LF}$ corresponding to the block by summing the respective pixel values or frequency values of a plurality of pixels included in the block B to each other, and may obtain the high-frequency information $E_{HF}$ corresponding to the block by summing the respective pixel values or frequency values of the plurality of pixels included in the block B.

The processor 120 may then obtain an energy variation amount for each block over time (i.e., low-frequency variation amount $\delta E_{LF}$ and the high-frequency variation amount $\delta E_{HF}$), based on Equation (3).

The processor 120 according to an embodiment may obtain the flicker intensity for each of the plurality of blocks (i.e., F-value and weight 1−F), based on the low-frequency variation amount $\delta E_{LF}$ and the high-frequency variation amount $\delta E_{HF}$. The disclosure describes this manner in detail below with reference to FIG. 7C.

Figure 7C:
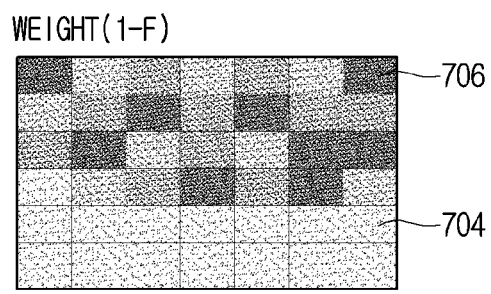
FIG. 7C is a diagram of a weight according to an embodiment.

FIG. 7C is a diagram of a weight according to an embodiment.

The processor 120 according to an embodiment may obtain the low-frequency variation amount $\delta E_{LF}$, based on the low-frequency information of the first block and the low-frequency information of the second block, and may obtain the high-frequency variation amount $\delta E_{HF}$, based on the high-frequency information of the first block and the high-frequency information of the second block.

The processor 120 may then obtain a first weight corresponding to the second block, based on the low-frequency variation amount $\delta E_{LF}$ and the high-frequency variation amount $\delta E_{HF}$.

Referring to FIG. 7C, the processor 120 may obtain the flicker intensity corresponding to each of the plurality of blocks, i.e. weight 1−F, based on the low-frequency variation amount $\delta E_{LF}$ and the high-frequency variation amount $\delta E_{HF}$ for each of the plurality of blocks included in the second frame 2.

The processor 120 may obtain the weight 1−F based on Equation (4), and the weight 1−F may have a value of zero to 1.

Referring to FIG. 7C, a bright color (e.g., block 704) may indicate that the weight 1−F corresponding to the block has a value close to 1, and a dark color (e.g., block 706) may indicate that the weight 1−F corresponding to the block has a value close to zero.

For example, the processor 120 may identify the energy variation amount (e.g., low-frequency variation amount $\delta E_{LF}$ and high-frequency variation amount $\delta E_{HF}$) for each of the plurality of blocks included in the frame, may predict that the flicker is about to occur in a block in which the high-frequency variation amount $\delta E_{HF}$ is greater than the low-frequency variation amount $\delta E_{LF}$, and may allow the high-frequency component of the corresponding block to have a minimized amplification, thereby preventing the occurrence of the flicker.

For example, if the difference value obtained by subtracting the low-frequency variation amount $\delta E_{LF}$ from the high-frequency variation amount $\delta E_{HF}$ is greater than or equal to the second threshold value, the processor 120 may obtain 1 as the F-value corresponding to the corresponding block and zero as the weight 1−F, and may allow the high-frequency component not to be amplified based on Equation (6).

For another example, if the difference value obtained by subtracting the low-frequency variation amount $\delta E_{LF}$ from the high-frequency variation amount $\delta E_{HF}$ is less than or equal to the first threshold value (e.g., if the low-frequency variation amount $\delta E_{LF}$ and the high-frequency variation amount $\delta E_{HF}$ are the same as each other), the processor 120 may obtain zero as the F-value and 1 as the weight 1−F, and may improve the clarity, details, image quality and the like of the image by summing the block and the high-frequency component of the block to each other.

Referring to FIG. 7C, a block having a large difference between the high-frequency variation amount $\delta E_{HF}$ and the low-frequency variation amount $\delta E_{LF}$ may have the bright color (e.g., block 704) because the weight 1−F has the value close to zero, and a block having a small difference between the high-frequency variation amount $\delta E_{HF}$ and the low-frequency variation amount $\delta E_{LF}$ may have a dark color (e.g., block 706) because the weight 1−F has the value close to 1. However, these specific numbers and the colors are only examples, and may be variously changed.

The processor 120 according to an embodiment of the disclosure may obtain a high-frequency block to which the first weight is applied, by applying the first weight corresponding to the second block to the high-frequency block corresponding to the second block among the plurality of blocks included in the high-frequency frame. Referring to FIG. 7B, the high-frequency block to which the first weight is applied may be a high-frequency block corresponding in position to the second block among the plurality of high-frequency blocks included in the high-frequency frame $I_{HF(t)}$ 2-2 corresponding to the second frame 2.

For example, the processor 120 may obtain the high-frequency block to which the first weight is applied, based on Equation (5) described above. Reference is made to Equation (5) above.

IHF(t)' may indicate the high-frequency block to which the first weight is applied, $I_{HF(t)}$ may indicate the high-frequency block included in the high-frequency frame 2-2 of the second frame 2, and 1−F may indicate the first weight corresponding to the second block included in the second frame 2.

The processor 120 may then obtain an output block based on the second block included in the second frame 2 and the high-frequency block to which the first weight is applied. For example, the processor 120 may obtain the output block by summing pixel values included in the second block and corresponding pixel values in the high-frequency block to which the first weight is applied to each other.

The processor 120 according to an embodiment may obtain the high-frequency frame $I_{HF(t)}{}'$ to which the weight is applied, by applying the weight corresponding to each of the plurality of blocks included in the high-frequency frame $I_{HF(t)}$ 2-2 of the second frame 2, based on Equation (5). The high-frequency frame $I_{HF(t)}{}'$ to which the weight is applied may be a combination of the high-frequency blocks, to which the weight corresponding to each of the plurality of blocks is applied.

Figure 8:
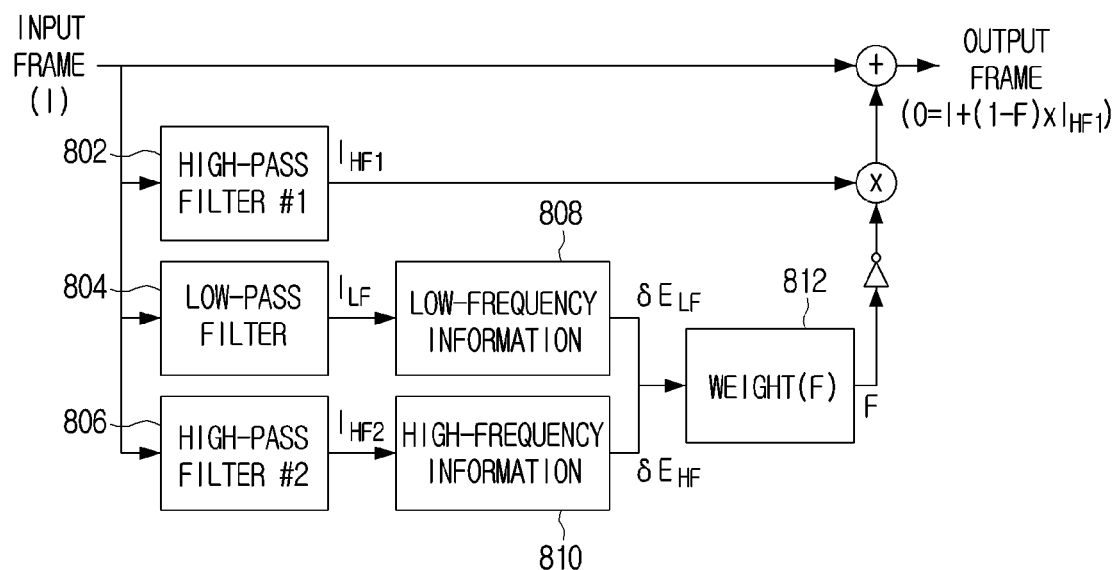
FIG. 8 is a diagram of a system for obtaining an output frame, according to an embodiment.

FIG. 8 is a diagram of a system for obtaining an output frame according to an embodiment. The processor 120 may obtain the output frame O by summing the second frame 2 and the high-frequency frame IHF(t)' to which the weight is applied. The system may include a first HPF 802, an LPF 804, a second HPF 806, low-frequency information 808, high-frequency information 810, and a weight 812.

Referring to FIG. 8, the processor 120 according to another embodiment of the disclosure may obtain the low-frequency information 808 and the high-frequency information 810 by using a plurality of filters 802, 804 and 806. For convenience of explanation, the description with reference to FIG. 8 describes a case of obtaining the output frame O which corresponds to the second frame 2 by assuming that the second frame 2 is the input frame I at the time point t.

The processor 120 according to an embodiment may obtain the low-frequency frame $I_{LF}$ which corresponds to the second frame 2 by using the LPF 804.

In addition, the processor 120 may obtain a first high-frequency frame $I_{HF1}$ which corresponds to the second frame 2 by using the first HPF 802, and may obtain a second high-frequency frame $I_{HF2}$ which corresponds to the second frame 2 by using the second HPF 806.

The processor 120 may then obtain the low-frequency information $E_{LF}$ 808 based on the low-frequency frame $I_{LF}$ and, may obtain the high-frequency information $E_{HF}$ 810 based on the second high-frequency frame $I_{HF2}$.

The processor 120 may obtain the low-frequency variation amount $\delta E_{LF}$ and the high-frequency variation amount $\delta E_{HF}$ each corresponding to the second frame, based on the low-frequency information $E_{LF}$ 808 and the high-frequency information $E_{HF}$, 810 and may obtain the weight 1−F 812.

The processor 120 may then apply the weight 1−F 812 to the first high-frequency frame $I_{HF1}$ which is obtained using the first HPF 802 to obtain the high-frequency frame to which the weight is applied, and may sum the second frame 2 and the third frame to obtain the output frame O.

The first HPF 802 and the second HPF 806 may have filtering intensity different from each other. For example, the first HPF 802 may have lower filtering intensity than the second HPF 806. However, this configuration is only an example, and may not be limited thereto. For another example, if the first HPF 802 and the second HPF 808 have the same filtering intensity, the output frame O obtained using the configuration shown in FIG. 8 may be the same as the output frame O of FIG. 3.

According to another embodiment of the disclosure, the processor 120 may obtain, from the first frame, the low-frequency information greater than or equal to the first threshold frequency and lower than the second threshold frequency. In addition, the processor 120 may obtain medium frequency information from the second frame.

For example, the processor 120 may obtain the low-frequency information greater than or equal to the first threshold frequency and lower than the second threshold frequency, and which corresponds to the first frame among the plurality of frames by using the plurality of filters having intensity different from each other (e.g., LPF, HPF, band-pass filter (BPF), etc.). In addition, the processor 120 may obtain the low-frequency information greater than or equal to the first threshold frequency and less than the second threshold frequency, and corresponding to the second frame.

The low-frequency information may be referred to as the medium frequency information greater than or equal to the first threshold frequency and lower than the second threshold frequency. Hereinafter, for convenience of explanation, the description collectively indicates the medium frequency information which is differentiated from the high-frequency information as the low-frequency information.

The processor 120 may then obtain the low-frequency variation amount, based on the low-frequency information greater than or equal to the first threshold frequency and lower than the second threshold frequency, and which corresponds to each of the first frame and the second frame.

The processor 120 may then obtain the weight based on the low-frequency variation amount and the high-frequency variation amount. For example, the processor 120 may obtain the weight based on the difference value obtained by subtracting the low-frequency variation amount from the high-frequency variation amount.

Figure 9:
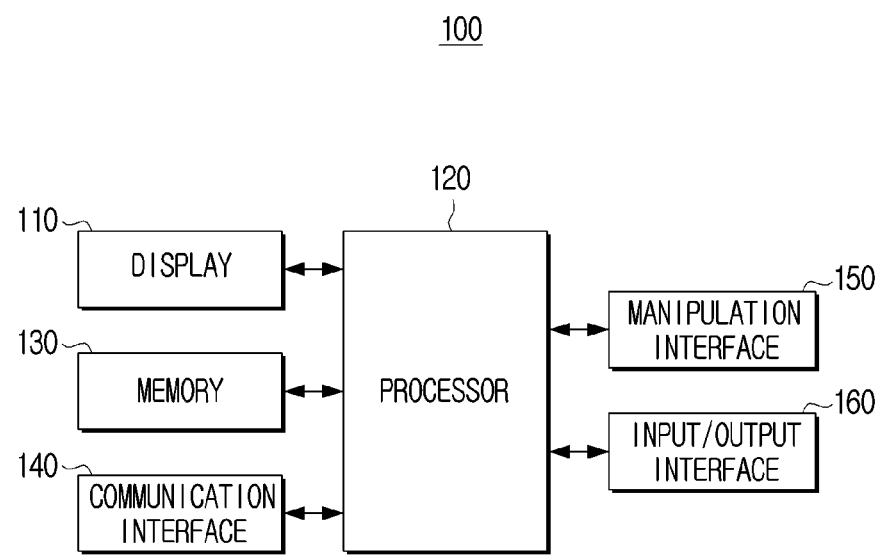
FIG. 9 is a diagram of a configuration of the electronic apparatus according to an embodiment.

FIG. 9 is a diagram of a configuration of the electronic apparatus according to an embodiment.

Referring to FIG. 9, the electronic apparatus 100 may include the display 110, the processor 120, a memory 130, a communication interface 140, a manipulation interface 150 and an input/output interface 160. The description omits a redundant description of the components described with reference to FIG. 2.

The memory 130 included in the electronic apparatus 100 according to an embodiment of the disclosure may be implemented as an internal memory such as a read-only memory (ROM, e.g., electrically erasable programmable read-only memory (EEPROM)) or a random access memory (RAM), included in the processor 120, or as a memory separate from the processor 120. In this case, the memory 130 may be implemented in the form of a memory embedded in the electronic apparatus 100 or in the form of a memory removable from the electronic apparatus 100, based on a data storing purpose. For example, data for driving the electronic apparatus 100 may be stored in the memory embedded in the electronic apparatus 100, and data for the extended function of the electronic apparatus 100 may be stored in the removable memory in the electronic apparatus 100. The memory embedded in the electronic apparatus 100 may be implemented as at least one of a volatile memory (e.g., dynamic RAM (DRAM), static RAM (SRAM) or synchronous dynamic RAM (SDRAM)) or a non-volatile memory (e.g., one time programmable ROM (OTPROM), programmable ROM (PROM), erasable and programmable ROM (EPROM), electrically erasable and programmable ROM (EEPROM), a mask ROM, a flash ROM, a flash memory (e.g., NAND flash or NOR flash), a hard drive or a solid state drive (SSD)); and the memory removable from the electronic apparatus 100 may be implemented as a memory card (e.g., compact flash (CF), secure digital (SD)), micro secure digital (Micro-SD), mini secure digital (mini-SD), extreme digital (xD) or multi-media card (MMC)) or an external memory which may be connected to a universal serial bus (USB) port (e.g., USB memory), etc.

In particular, under a control of the processor 120 according to an embodiment of the disclosure, the memory 130 may store the low-frequency information $E_{LF}$ and the high-frequency information $E_{HF}$, obtained from a frame corresponding to each time point, and may load the low-frequency information $E_{LF}$ and the high-frequency information $E_{HF}$, obtained from a frame corresponding to a previous time point to obtain the weight F (or flicker intensity) of a frame corresponding to a next time point. In addition, the number of the blocks dividing the frame may be proportional to a size of the storage space of the memory 130.

The communication interface 140 according to an embodiment of the disclosure may transmit or receive the data by performing communication with an external device (e.g., source device or external user terminal), an external storage medium (e.g., universal serial bus (USB) memory), an external server (e.g., web hard) or the like by using a communication method such as an access point (AP) based wireless fidelity (Wi-Fi, i.e. wireless local area network (LAN)), a bluetooth, a zigbee, a wired/wireless local area network (LAN), a wide area network (WAN), Ethernet, an IEEE 1394, a high definition multimedia interface (HDMI), a USB, a mobile high-definition link (MHL), an audio engineering society/European broadcasting union (AES/EBU) communication, an optical communication or a coaxial communication.

In particular, the electronic apparatus 100 according to an embodiment of the disclosure may receive the image including the plurality of frames from the external device using the communication interface 140, and may transmit the image-processed output frame O to the external device.

The manipulation interface 150 may be implemented in a device such as a button, a touch pad, a mouse and a keyboard, or may be implemented in a touch screen capable of also performing an operation input function in addition to the above-described display function. The button may be any of various types of buttons such as a mechanical button, a touch pad, a wheel or the like, which is positioned in any region, such as a front surface portion, a side surface portion or a rear surface portion, of a body appearance of the electronic apparatus 100.

The input/output interface 160 may be any of a high definition multimedia interface (HDMI), a mobile high-definition link (MHL), a USB, a display port (DP), a thunderbolt, a video graphics array (VGA) port, a red-green-blue (RGB) port, a D-subminiature (D-SUB) or a digital visual interface (DVI).

The input/output interface 160 may input/output at least one of audio or video signals.

According to the embodiments, the input/output interface 160 may include a port for inputting and outputting only an audio signal and a port for inputting and outputting only a video signal as its separate ports, or may be implemented as a single port for inputting and outputting both the audio signal and the video signal.

Figure 10:
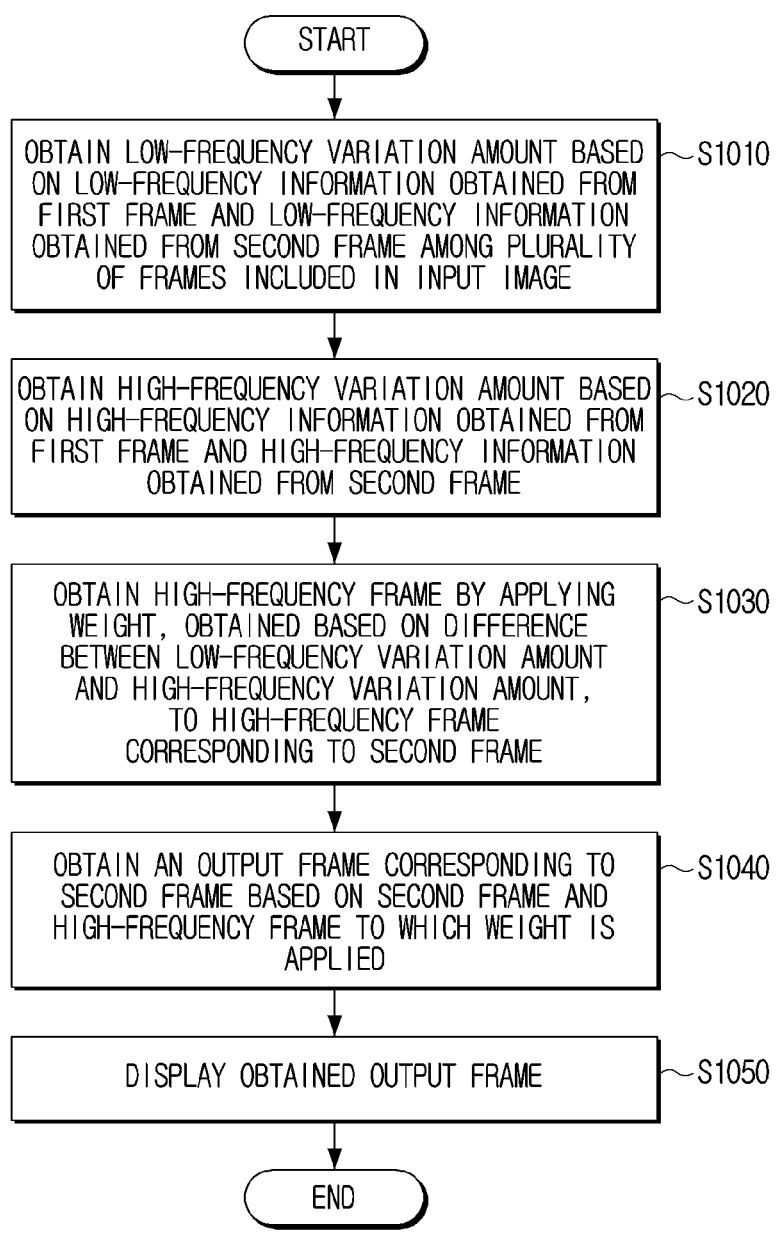
FIG. 10 is a flowchart of a control method of the electronic apparatus according to an embodiment.

FIG. 10 is a flowchart of a control method of the electronic apparatus according to an embodiment.

In operation S1010, the control method of the electronic apparatus according to an embodiment of the disclosure may first include obtaining low-frequency variation amount, based on low-frequency information obtained from a first frame and low-frequency information obtained from a second frame, among a plurality of frames included in an input image.

In operation S1020, the method may then include obtaining high-frequency variation amount, based on high-frequency information obtained from the first frame and high-frequency information obtained from the second frame.

In operation S1030, the method may then include obtaining a high-frequency frame, by applying a weight, obtained based on a difference between the low-frequency variation amount and the high-frequency variation amount, to a high-frequency frame corresponding to the second frame.

In operation S1040, the method may then include obtaining an output frame corresponding to the second frame, based on the second frame and the high-frequency frame to which the weight is applied.

In operation S1050, the method may then include displaying the obtained output frame.

The operation S1030 of obtaining the high-frequency frame to which the weight is applied may include obtaining the weight inversely proportional to a difference value obtained by subtracting the low-frequency variation amount from the high-frequency variation amount.

The control method according to an embodiment of the disclosure may further include dividing each of the first frame and the second frame into block units having a predetermined size, where the operation S1010 of obtaining the low-frequency variation amount may include obtaining the low-frequency variation amount, based on the low-frequency information of a first block among the plurality of blocks included in the first frame, and the low-frequency information of a second block corresponding to the first block, among the plurality of blocks included in the second frame, the operation S1020 of obtaining the high-frequency variation amount may include obtaining the high-frequency variation amount, based on the high-frequency information of the first block and the high-frequency information of the second block, the operation S1030 of obtaining the high-frequency frame to which the weight is applied may include obtaining a high-frequency block to which a first weight is applied, by applying the first weight, obtained based on the difference between the low-frequency variation amount and the high-frequency variation amount, to a high-frequency block corresponding to the second block among the plurality of blocks included in the high-frequency frame, and the operation S1040 of obtaining the output frame may include obtaining an output block corresponding to the second block, based on the second block and the high-frequency block to which the first weight is applied.

According to an embodiment of the disclosure, the operation S1030 of obtaining the high-frequency frame to which the weight is applied may include obtaining the plurality of weights by comparing the low-frequency variation amount with the high-frequency variation amount, corresponding to each of the plurality of blocks included in the second frame, and obtaining the high-frequency frame to which the plurality of weights are applied, by applying the weight corresponding to each of the plurality of blocks included in the high-frequency frame.

The operation S1040 of obtaining the output frame according to an embodiment of the disclosure may include obtaining the output block by summing pixel values included in the second block and corresponding pixel values in the high-frequency block if the difference between the low-frequency variation amount and the high-frequency variation amount is less than or equal to a first threshold value, and obtaining the second block as the output block if the difference between the low-frequency variation amount and the high-frequency variation amount is greater than or equal to a second threshold value.

The operation S1040 of obtaining the output frame according to an embodiment of the disclosure may include obtaining the output block, based on the first weight obtained based on the difference value obtained by subtracting the low-frequency variation amount from the high-frequency variation amount if the difference value obtained by subtracting the low-frequency variation amount from the high-frequency variation amount is greater than the first threshold value and smaller than the second threshold value.

The control method according to an embodiment of the disclosure may further include obtaining the high-frequency frame corresponding to the second frame by applying a first HPF to the second frame, where the operation S1010 of obtaining the low-frequency variation amount may include obtaining the low-frequency frame and the low-frequency information, corresponding to the second frame by applying an LPF to the second frame, the operation S1020 of obtaining the high-frequency variation amount may include obtaining the high-frequency information corresponding to the second frame by applying a second HPF to the second frame, and the operation S1030 of obtaining the high-frequency frame to which the weight is applied may include obtaining the high-frequency frame to which the weight is applied, by applying the weight, obtained based on the low-frequency variation amount and the high-frequency variation amount, to the high-frequency frame.

The operation S1040 of obtaining the output frame according to an embodiment of the disclosure may include obtaining the weight, based on a ratio of the high-frequency variation amount to the low-frequency variation amount.

The operation S1010 of obtaining the low-frequency variation amount according to an embodiment of the disclosure may include obtaining the low-frequency frame and the low-frequency information, corresponding to the second frame and lower than a threshold frequency, by applying an LPF to the second frame, and the operation S1020 of obtaining the high-frequency variation amount may include obtaining the high-frequency frame and the high-frequency information, corresponding to the second frame and greater than or equal to the threshold frequency, based on a difference between the second frame and the low-frequency frame.

The operation S1010 of obtaining the low-frequency variation amount according to an embodiment of the disclosure may include obtaining the low-frequency variation amount, based on the low-frequency information obtained from the first frame and greater than or equal to the first threshold frequency and lower than the second threshold frequency, and the low-frequency information obtained from the second frame, and the operation S1040 of obtaining the output frame may include obtaining the weight, based on the difference value obtained by subtracting the low-frequency variation amount from the high-frequency variation amount.

The various embodiments of the disclosure may be applied not only to the electronic apparatus, but also to all types of electronic apparatus including the display.

The various embodiments of the disclosure described above may be implemented in a computer or a computer readable recording medium using software, hardware or a combination of software and hardware. In some cases, the embodiments described in disclosure may be implemented by the processor itself. According to a software implementation, the embodiments such as procedures and functions described in the disclosure may be implemented by separate software modules. Each of the software modules may perform one or more functions and operations described in the disclosure.

Meanwhile, computer instructions for performing processing operations of the electronic apparatus 100 according to the various embodiment of the disclosure described above may be stored in a non-transitory computer-readable medium. The computer instructions stored in the non-transitory computer-readable medium may allow a specific device to perform the processing operations of the electronic apparatus 100 according to the various embodiments described above if they are executed by the processor of a specific device.

The non-transitory computer-readable medium may not be a medium that temporarily stores data, such as a register, a cache or a memory, and may be a medium that semi-permanently stores data and readable by the machine. A specific example of the non-transitory computer-readable medium may include a compact disk (CD), a digital versatile disk (DVD), a hard disk, a blu-ray disk, a USB, a memory card or a ROM.

Although the embodiments of the disclosure have been illustrated and described hereinabove, the disclosure is not limited to the abovementioned specific embodiments, and may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic apparatus comprising:
a display; and
a processor configured to:
obtain a low-frequency variation amount based on low-frequency information corresponding to a first frame and low-frequency information corresponding to a second frame,
obtain a high-frequency variation amount based on high-frequency information corresponding to the first frame and high-frequency information corresponding to the second frame,
obtain a weight based on a difference between the low-frequency variation amount and the high-frequency variation amount,
apply the weight to a high-frequency frame corresponding to the second frame,
obtain an output frame corresponding to the second frame, based on the second frame and a high-frequency frame to which the weight is applied, and
control the display to display the obtained output frame.

2. The electronic apparatus of claim 1, wherein the weight is inversely proportional to a difference value, and
wherein the difference value is obtained by subtracting the low-frequency variation amount from the high-frequency variation amount.

3. The electronic apparatus of claim 1, wherein the processor is further configured to:
obtain the low-frequency variation amount based on:
first low-frequency information of a first block among a plurality of blocks included in the first frame, and
second low-frequency information of a second block among a plurality of blocks included in the second frame,
obtain the high-frequency variation amount based on first high-frequency information of the first block and second high-frequency information of the second block,
obtain a first weight corresponding to the second block, based on a difference between the low-frequency variation amount and the high-frequency variation amount,
apply the first weight to a high-frequency block corresponding to the second block, and
obtain an output block corresponding to the second block, based on the second block and the high-frequency block to which the first weight is applied.

4. The electronic apparatus of claim 3, wherein the processor is further configured to:
obtain a plurality of weights by comparing the low-frequency variation amount with the high-frequency variation amount, corresponding to each of the plurality of blocks included in the second frame, and apply each weight of the plurality of weights to corresponding block among the plurality of blocks included in the high-frequency frame corresponding to the second frame.

5. The electronic apparatus of claim 3, wherein the processor is further configured to:
obtain the output block by summing pixel values included in the second block and corresponding pixel values in the high-frequency block based on the difference between the low-frequency variation amount and the high-frequency variation amount being less than or equal to a first threshold value, and
obtain the second block as the output block based on the difference between the low-frequency variation amount and the high-frequency variation amount being greater than or equal to a second threshold value.

6. The electronic apparatus of claim 5, wherein the processor is further configured to obtain the output block based on the first weight, based on the difference between the low-frequency variation amount and the high-frequency variation amount being greater than the first threshold value and less than the second threshold value.

7. The electronic apparatus of claim 1, wherein the processor is further configured to:
obtain the high-frequency frame corresponding to the second frame by applying a first high-pass filter (HPF) to the second frame,
obtain the low-frequency information corresponding to the second frame by applying a first low-pass filter (LPF) to the second frame, and
obtain the high-frequency information corresponding to the second frame by applying a second HPF to the second frame.

8. The electronic apparatus of claim 1, wherein the processor is further configured to obtain the weight based on a ratio of the high-frequency variation amount to the low-frequency variation amount.

9. The electronic apparatus of claim 1, wherein the processor is further configured to:
obtain a low-frequency frame corresponding to the second frame and the low-frequency information including a frequency lower than a threshold frequency, by applying a low-pass filter (LPF) to the second frame, and
obtain the high-frequency frame and the high-frequency information, corresponding to the second frame including a frequency greater than or equal to the threshold frequency, based on a difference between the second frame and the low-frequency frame.

10. The electronic apparatus of claim 1, wherein the processor is further configured to:
obtain the low-frequency variation amount, based on the low-frequency information obtained from the first frame including a frequency greater than or equal to a first threshold frequency and less than a second threshold frequency.

11. A control method of an electronic apparatus, comprising:
obtaining a low-frequency variation amount based on low-frequency information corresponding to a first frame and low-frequency information corresponding to a second frame;
obtaining a high-frequency variation amount based on high-frequency information corresponding to the first frame and high-frequency information corresponding to the second frame;

obtaining a weight based on a difference between the low-frequency variation amount and the high-frequency variation amount;
applying the weight to a high-frequency frame corresponding to the second frame;
obtaining an output frame corresponding to the second frame, based on the second frame and a high-frequency frame to which the weight is applied; and
displaying the obtained output frame.

12. The control method of claim 11, wherein the weight is inversely proportional to a difference value obtained by subtracting the low-frequency variation amount from the high-frequency variation amount.

13. The control method of claim 11, wherein the obtaining of the low-frequency variation amount includes obtaining the low-frequency variation amount, based on first low-frequency information of a first block among a plurality of blocks included in the first frame, and second low-frequency information of a second block among a plurality of blocks included in the second frame,
wherein the obtaining of the high-frequency variation amount includes obtaining the high-frequency variation amount, based on first high-frequency information of the first block and second high-frequency information of the second block,
wherein the obtaining the weight includes obtaining a first weight corresponding to the second block, based on a difference between the low-frequency variation amount and the high-frequency variation amount,
wherein the applying the weight includes applying the first weight to a high-frequency block corresponding to the second block, and
wherein the obtaining of the output frame includes obtaining an output block corresponding to the second block, based on the second block and the high-frequency block to which the first weight is applied.

14. The control method of claim 13, wherein the obtaining the weight comprises:
obtaining a plurality of weights by comparing the low-frequency variation amount with the high-frequency variation amount, corresponding to each of the plurality of blocks included in the second frame, and
wherein the applying the weight comprises:
apply each weight of the plurality of weights to corresponding block among the plurality of blocks included in the high-frequency frame corresponding to the second frame.

15. The control method of claim 13, wherein the obtaining of the output frame comprises:
obtaining the output block by summing pixel values included in the second block and corresponding pixel values in the high-frequency block based on the difference between the low-frequency variation amount and the high-frequency variation amount being less than or equal to a first threshold value, and
obtaining the second block as the output block based on the difference between the low-frequency variation amount and the high-frequency variation amount being greater than or equal to a second threshold value.

16. An electronic apparatus, comprising:
a memory storing instructions, and
a processor configured to execute the instructions to:
obtain a low-frequency variation value based on low frequency information corresponding to a first frame and a second frame;

obtain a high-frequency variation value based on high frequency information corresponding to the first frame and the second frame;

determine a weight based on a difference between the high-frequency variation value and the low-frequency variation value; and generating an output frame corresponding to the second frame by applying the weight to a high-frequency frame corresponding to the second frame.

17. The electronic apparatus of claim 16, wherein the weight is inversely proportional to the difference between the high-frequency variation value and the low-frequency variation value.

18. The electronic apparatus of claim 16, wherein the processor is further configured to execute the instructions to:

generate a first high-frequency block by applying the weight to a second high-frequency block corresponding to a second block among a plurality of blocks of the second frame, and output an output block corresponding to the second block, based on the second block and the first high-frequency block.

19. The electronic apparatus of claim 18, wherein the processor is further configured to execute the instructions to obtain the output block by summing pixel values included in the second block and corresponding pixel values in the first high-frequency block based on the difference between the high-frequency variation value and the low-frequency variation value being less than or equal to a first threshold value.

20. The electronic apparatus of claim 18, wherein the processor is further configured to execute the instructions to obtain the second block as the output block based on the difference between the high-frequency variation value and the low-frequency variation value being greater than or equal to a second threshold value.

* * * * *